(12) United States Patent
Brommer et al.

(10) Patent No.: US 7,777,626 B2
(45) Date of Patent: *Aug. 17, 2010

(54) RFID TAG INCORPORATING AT LEAST TWO INTEGRATED CIRCUITS

(75) Inventors: Karl D. Brommer, Exeter, NH (US); Kenneth R. Erikson, Henniker, NH (US); Timothy P. Butler, Needham, MA (US)

(73) Assignee: BAE Systems Information and Electronic Systems, Integration, Inc., Nashua, NH (US)

( * ) Notice: Subject to any disclaimer, the term of this patent is extended or adjusted under 35 U.S.C. 154(b) by 870 days.

This patent is subject to a terminal disclaimer.

(21) Appl. No.: 11/546,228

(22) Filed: Oct. 11, 2006

(65) Prior Publication Data

US 2007/0085689 A1 Apr. 19, 2007

Related U.S. Application Data

(60) Provisional application No. 60/726,145, filed on Oct. 13, 2005.

(51) Int. Cl.
*G08B 13/14* (2006.01)

(52) U.S. Cl. .............. 340/572.1; 340/572.7; 340/10.1

(58) Field of Classification Search ...... 340/572.1–572, 340/10.1–10.69
See application file for complete search history.

(56) References Cited

U.S. PATENT DOCUMENTS

| 5,764,138 | A | * | 6/1998 | Lowe | 340/447 |
|---|---|---|---|---|---|
| 6,204,819 | B1 | | 3/2001 | Hayes et al. | |
| 6,246,327 | B1 | * | 6/2001 | Eberhardt | 340/572.1 |
| 6,538,563 | B1 | * | 3/2003 | Heng | 340/10.2 |
| 7,102,522 | B2 | * | 9/2006 | Kuhns | 340/572.7 |
| 7,575,957 | B2 | * | 8/2009 | Huang et al. | 438/123 |
| 2001/0015703 | A1 | | 8/2001 | Nieminen | |
| 2002/0014993 | A1 | | 2/2002 | Turner et al. | |
| 2002/0177408 | A1 | | 11/2002 | Forster et al. | |
| 2002/0180020 | A1 | * | 12/2002 | Lin et al. | 257/686 |
| 2005/0194671 | A1 | * | 9/2005 | Yoshikawa et al. | 257/684 |
| 2006/0007049 | A1 | * | 1/2006 | Nitzan et al. | 343/904 |
| 2008/0062049 | A1 | * | 3/2008 | Soler Castany et al. | 343/702 |

OTHER PUBLICATIONS

Per International Search Report mailed Feb. 6, 2008 of International Application # PCT/US2006/040391 filed Oct. 13, 2006.

* cited by examiner

*Primary Examiner*—Daniel Wu
*Assistant Examiner*—Ryan W Sherwin
(74) *Attorney, Agent, or Firm*—Robert K. Tendler; Daniel J. Long

(57) ABSTRACT

Multiple RFID integrated circuit microradio chips are located at the feed point of an RFID tag antenna for greater reliability, elimination of testing and to take advantage of coherent microradio operation for increased gain and power, better signal-to-noise ratios, improved range and low bit error rates.

10 Claims, 6 Drawing Sheets

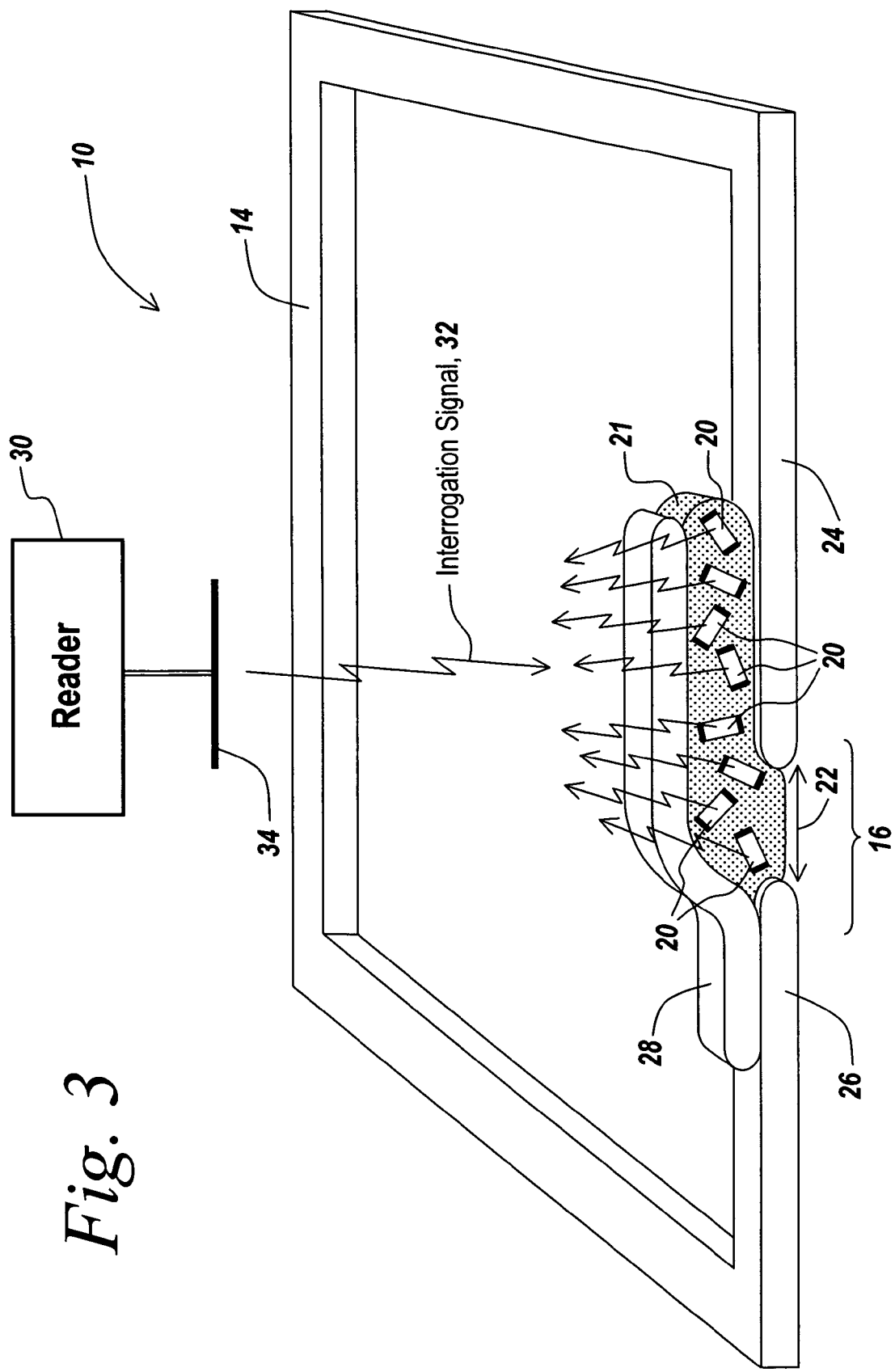

RFID TAG INCORPORATING AT LEAST TWO INTEGRATED CIRCUITS

RELATED APPLICATIONS

This Application claims rights under 35 USC §119(e) from U.S. Provisional Application Ser. No. 60/726,145 filed Oct. 13, 2005, the contents of which are incorporated herein by reference. This application is related to PCT Patent Applications: US2006/033,111 filed Aug. 24, 2006 by Kenneth R. Erikson, entitled "RFID Tag and Method and Apparatus for Manufacturing Same;" US2006/033,048 filed Aug. 24, 2006 by Court Rossman, Zane Lo, Roland Gilbert and John Windyka, entitled "Methods for Coupling an RFID Chip to an Antenna;" US2006/033,049 filed Aug. 24, 2006 by Steve A. Hedges and Kenneth R. Erikson, entitled "Method and Apparatus For Coupling Multiple Microradios To an RFID Tag Antenna;" US2006/033,112 filed Aug. 24, 2006 by Karl D. Brommer and Kenneth R. Erikson, entitled "Coherent Multichip RFID Tag and Method and Apparatus for Creating such Coherence;" and US2006/024,630, filed Jun. 23, 2006 by Daniel N. Carothers and entitled "CMOS Process for Fabrication of Ultra-small and Non-standard Size or Shape Semiconductor Die." The contents of these applications are incorporated herein by reference.

FIELD OF THE INVENTION

This invention relates to the use of Radio Frequency Identification (RFID) tags for tracking items during shipping, receiving the items at final destination and inventory control of items and more particularly to the use of multiple integrated circuit microradios at the feed point of a tag antenna.

BACKGROUND OF THE INVENTION

RFID tags are becoming a well-established method for tracking materials during shipping and storage. In many applications they replace the printed bar code labels on items because they do not require a close proximity for the automatic reader. RFID tags that conform to the ISO/IEC 18000 or epcGlobal standards also can contain significantly more data than a printed bar code label and can be modified en route to include waypoint or other information.

There are two main classes of RFID tags: passive and active. A passive tag derives its energy for operation from the RF field of the reader and responds to the reader by modulating the reflectivity of its antenna, thereby returning varying amounts of the incident RF energy. An active tag responds to the reader using RF energy derived from a battery on the tag.

Present RFID tags are fabricated by electrically bonding a single custom integrated circuit (IC) microradio to a substrate containing a printed circuit antenna. The usual fabrication method, well known in the electronics industry is flip-chip bonding using pick-and-place machines.

However, the use of a single integrated circuit microradio chip presents certain problems. First is the operability of the chip itself. Production yields for the IC are not high enough to guarantee operability without testing. Testing individual ICs either prior to tag mounting or after tag manufacture is a very costly and complicated procedure, especially when tags are miniaturized for item-level tagging. Also pick-and-place techniques cannot guarantee proper chip coupling to the antenna due to the small sizes involved. Moreover, ever smaller sizes are desirable to reduce the cost of the chips and thus the cost of the tag to under 5 cents, necessitating other chip mounting techniques.

One such chip mounting technique is described in PCT Application Serial No. US2006/033,111 filed Aug. 24, 2006 by Kenneth R. Erikson, entitled "RFID Tag and Method and Apparatus for Manufacturing Same," which describes a method for fabricating a low cost RFID tag wherein at least two integrated circuits, and preferably hundreds, are deposited at the feed point of the tag antenna. In one embodiment the integrated circuit microradio chips are mixed in a nonconductive slurry that is printed onto the antenna feed point, followed by patterning electrodes and programming.

PCT Application Serial No. US2006/033,112 filed Aug. 24, 2006 by Karl D. Brommer and Kenneth R. Erikson, entitled "Coherent Multichip RFID Tag and Method and Apparatus for Creating such Coherence," describes a method for causing the multiple integrated circuit microradio chips to work together cooperatively.

Causing these microradio chips to work cooperatively also can include polarization control described in PCT Patent Application No. US2006/033,112, filed Aug. 24, 2005 by Steve A. Hedges et al.

SUMMARY OF INVENTION

In order to reduce the overall price of RFID tags and to increase reliability as well as increase range and/or provide a better signal-to-noise ratio that results in better bit error rates, in the subject invention multiple integrated circuit microradio chips are coupled to the tag antenna at its feed point. Then these microradio chips are made to operate in a cooperative or coherent fashion.

As used herein, the microradio chips are said to be coheretized in that all of the microradio chips coupled to a single RFID tag antenna feed point produce signals that are identical in amplitude and phase. Moreover, for microradio chips that present a particular polarization, the polarization is reversible so that the polarizations of all of the microradio chips are the same. Further, when microradios are deposited at the feed point of the tag antenna, only those that are properly coupled to the feed point are activated.

How these microradios are deposited at the feed point of the antenna is discussed in PCT Application Serial No. US2006/033111 filed Aug. 24, 2006 by Kenneth R. Erikson, entitled "RFID Tag and Method and Apparatus for Manufacturing Same;" whereas coherent operation is discussed in PCT Application Serial No. US2006/033112 filed Aug. 24, 2006 by Karl D. Brommer and Kenneth R. Erikson, entitled "Coherent Multichip RFID Tag and Method and Apparatus for Creating such Coherence." Polarization control is covered in PCT Patent Application Serial No. US2006/033049 filed on Aug. 24, 2006 by Steve A. Hedges and Kenneth R. Erikson, entitled "Method and Apparatus For Coupling Multiple Microradios To an RFID Tag Antenna."

The result of using more than one integrated circuit at the feed point of a tag antenna is first and foremost that one does not have to test each and every integrated circuit. This is because, when using hundreds or thousands of microradios at the feed point of the antenna, the probability of failure when raised to the n power results in a negligible failure probability. This eliminates the requirement of testing either the integrated circuits themselves or the coupling of the integrated circuits to the feed point of the antenna. Moreover, because of the numbers of microradio chips at the antenna feed point, reliability is increased.

Additionally, when the microradios are coheretized as described above, then the gain or power output is increased.

When such coherent operation is achieved one can, for instance, power and read the RFID tags from as far away as one kilometer due to the power gain that enables a wide variety of tracking applications.

Also, with the power gain associated with coheretized chips, one obtains a better signal-to-noise ratio. This in turn translates either into a better bit error rate or alternatively an increase in range.

Thus for RFID tags used in tracking, assuming appropriate reader power, one can, for instance, track trucks, vehicles, livestock, or individual items from afar.

If in addition, during the programming of the multiple integrated circuit microradio chips, one can correct for polarization reversals, then the ability of the microradio chips to work together is increased due to the identical polarization directions of the microradio chips, which minimizes interchip interference.

Further, during programming it is possible to activate only those integrated circuit microradio chips that are tightly coupled to the tag antenna, again increasing power or gain.

Finally, as a result of the ink jet fabrication techniques involving deposit of multiple microradio chips at an antenna feed point, costly pick-and-place machines are avoided.

In short, the use of more than one integrated circuit microradio chip at the feed point of an RFID tag antenna significantly reduces the cost of the RFID tags and does not involve pick-and-place machines, which are expensive. The use of large numbers of microradio chips also completely eliminates the requirement for testing. Additionally, due to the use of multiple integrated circuit microradio chips working in concert, one has greater reliability, more output power, greater range and/or better bit error rates depending on the tradeoffs involved.

In summary, multiple RFID integrated circuit microradio chips are located at the feed point of an RFID tag antenna for greater reliability, elimination of testing and to take advantage of coherent microradio operation for increased gain and power, better signal-to-noise ratios, improved range and low bit error rates. Having large numbers of integrated circuit microradio chips at the feed point of an RFID tag antenna, when coheretized, polarization controlled and orientation-controlled results in a low-cost RFID tag in which no pick-and-place costs are necessitated and in which testing requirements are eliminated. The provision of multiple integrated circuit microradio chips also results in better reliability, more power, greater range and better bit error rates.

BRIEF DESCRIPTION OF THE DRAWINGS

These and other features of the subject invention will be better understood in connection with the Detailed Description, in conjunction with the Drawings, of which:

FIG. 3 is a diagrammatic illustration of the deposition of multiple microradio chips in a non-conductive fluid at the feed point of a loop antenna in which the microradios are coupled to the feed point of the antenna, also illustrating the interrogation of the multiple integrated circuit microradios through the use of a reader;

DETAILED DESCRIPTION

Figure 2:
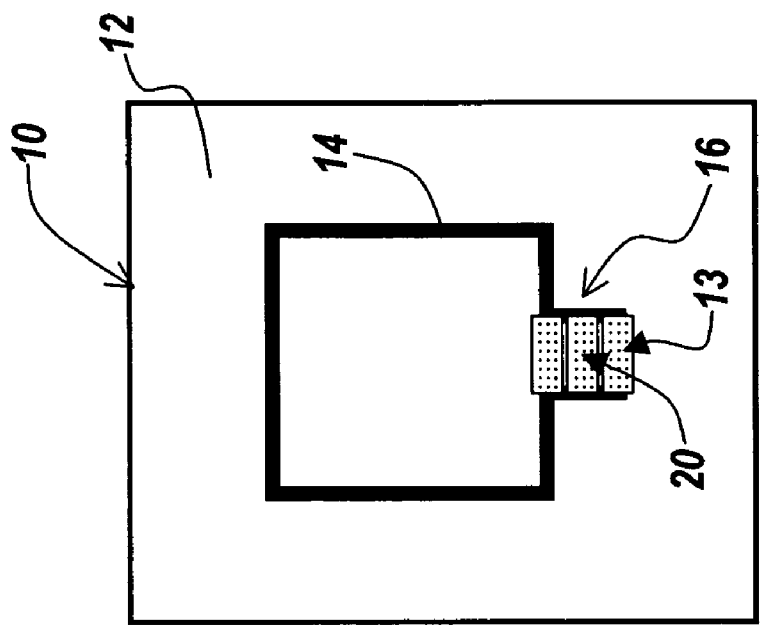
FIG. 2 is a diagrammatic illustration of the utilization of multiple integrated circuit microradio chips at the feed point of the loop antenna of FIG. 1.

By way of further background, radio Frequency Identification (RFID) tags have been utilized extensively to trace pallets of merchandise from a point of shipment to a final destination. The tags are typically passive devices that are read out with RF energy, usually in the 900 MHz range. These passive devices are parasitically powered by the RF energy impinging upon the antenna of the tag, thus powering the integrated circuits within the tag, with the result that the tag transmits the identity of the pallet in response to a probing signal from a reader in the vicinity of the tag.

While such RFID tags are now mandated for pallets in some industries, there is increased level of interest in item-level tagging, which involves placing a tag on the item itself as opposed to on a pallet of items.

However, in order to be able to make such tagging strategies possible for low-value items such as toothpaste and the like, techniques are required to be able to manufacture and deposit the tags on items at an overall cost of no more than 5 cents per item or less.

The relatively low price for the tagging of items is not so important in high-value items such as pharmaceuticals, where the tag price may be as much as 25 or 50 cents from start to finish. Rather, mass merchants are interested in keeping track of how much material is on their shelves for inventory control.

This means that, for short ranges, an individual carries a reader with him- or herself and probes the individual items, either in a walk-by scenario or as the items come into the facility, for instance on a conveyor belt. Also envisioned are so-called "smart shelves", in which the current stock of goods on a merchant's shelves can be remotely monitored and restocked as required.

Note that RFID technology is not merely a bar code technology, but rather one that can store data and, upon request from a reader, output data to a global database. The data can be as simple as a product ID code.

The desideratum using item-level RFID tags is that the whole shipment history of a product from the time it leaves the manufacturing plant to its final destination can be tracked through various hands such as shippers, importers, wholesalers and warehousemen.

If in its simplest embodiment the RFID tag merely contains an identification number, this number is read out along the way during shipment such that the transport history of the item can be ascertained.

It is noted that the current tags are passive tags in that they do not require or have a battery. This is useful because in item-level tagging, low cost is key, there is no space available for batteries and battery shelf life is not a problem.

With respect to tagging of a pallet, it is noted that a pallet is usually placed on a forklift truck and is driven, for instance, into a warehouse where it passes through the warehouse door at which a reader is located. The reader sends out RF energy that charges up the passive tag by transferring energy to the integrated circuits within the tag. The reader then transmits a special code that interrogates the RFID electronics so as to output the tag ID and any other related information stored by the tag.

These passive devices have a range of approximately 30 feet, given the fact that the Federal Communications Commission limits the amount of radiated power from the reader to be 1 watt.

As to the size of the tags that are currently placed on pallets, they are on the order of 2 inches by 2 inches, with the antenna dimensions being the dominating factor. It is noted that the larger the antenna, the greater the range, since a larger tag antenna can capture more energy from a reader. For short-range applications such as monitoring pill bottle inventories, the antenna can be indeed quite small.

Note that with small antennas the amount of energy available for the integrated circuits making up the tag is limited, with the energy being derived from a so-called rectenna that rectifies the RF energy and stores it on a capacitor. In these cases the energy from the capacitor is utilized to power up the circuitry that includes some kind of logic or even a microcomputer as well as a transmitter. Note that once the circuit is powered up the information is transmitted back to the reader.

Using the above tags to identify pallets is commonplace. However, the integrated circuits are relatively expensive, with the integrated circuit tending to be the most expensive part. Secondary to the expense of the integrated circuit itself is the cost involved in building the tag.

If pallets, for instance, contain high value items, a 50- or 75-cent tag may be affordable; however, for item level tags the cost needs to be kept under 5 cents or less.

Moreover, for item-level tags, the output of the transmitter of the RFID tag is in general in the microwatt range due to the small size antenna required. However, with sufficient size reduction there should be a concomitant cost reduction at least of the integrated circuits. If one could make the integrated circuits very, very small, in the tens of micron size, the cost per IC die goes down dramatically. This is because if one can utilize large wafers, one can make millions of individual die per wafer. With processing costs constant and sufficient yields, one can therefore reduce the cost of the tag under 5 cents.

For item-level tags, for instance on individual pill containers, one can arrange to have antennas that are perhaps a quarter of an inch on a side, with a tiny integrated circuit on them. However, even if one could make the micron-sized RFID tags, one is faced with a significant challenge in how to locate an RFID integrated circuit on the associated antenna at its feed point.

In an effort to reduce the cost of the individual chips, manufacturing large numbers of them on a large-size wafer, while theoretically reducing the cost of these chips, the individual chips are extremely hard to test and hard to handle. What is conventionally done now, at least for pallet-level RFID tags, is to use "pick-and-place" machines and size the individual integrated circuits to be at least large enough to enable the pick-and-place operation. Thus, the integrated circuits must be of a size that they can be taken off some kind of dispensing apparatus and physically moved where they can be deposited on and electrically connected to the antenna.

However, pick-and-place machines currently are limited to integrated circuits that are larger than a millimeter on a side.

If one could break through the barrier imposed by pick-and-place machines, for instance utilizing different deposition techniques, then one could garner the cost savings of manufacturing millions of integrated circuits on a single wafer. It would therefore be extremely useful in reducing the overall price of the RFID tag to be able to have integrated circuits as small as a $10^{th}$ of a millimeter on a side. Manufacturing of such small integrated circuits is possible with standard 90-nanometer integrated circuit technology. Even 65-nanometer technology in high volume applications is now state of the art.

However, just because one can lay down patterns that have 90-nanometer line widths or less, a serious limitation is the ability to be able to scribe and break the individual ICs apart from the die. Note that various scribing, breaking, and sawing techniques have been used in the past to separate out individual integrated circuits.

Using sawing, for example, the saw blade dimensions defines the kerf, which is the material that the saw blade requires in the removal of material. Note that in the applications being discussed herein, the kerf is larger than the desired size of the chips. This results in very inefficient use of a wafer and therefore added cost per die.

With laser scribing, smaller kerfs may be available. However, thermal issues limit this type of scribing technique to chip dimensions that are still larger than desirable.

Chemical etching is another alternative method. However, conventional approaches lead to severe undercutting of the die, again adding to the kerf dimensions. There is, however, a unique chemical etching process that limits undercutting in which microscopic die can be formed utilizing standard CMOS processes.

Assuming that one can separate out the microscopic chips, mounting an individual chip to an antenna feed point can be accomplished through the use of a shaped die and a specially shaped receiver cavity. In such so-called "self-assembly methods", these shaped die are squeegeed over in a slurry across a substrate that has one receiver cavity for one antenna feed point in which the cavity is adapted to uniquely hold the specially-shaped die.

This type of self-assembly method, illustrated in U.S. Pat. No. 6,864,570 and licensed to Alien Technology, requires a match between the orientation of the die and the receptacle. Thus the specially shaped ICs have to match the corresponding cavities and if they are randomly oriented in the slurry, they will either not enter the cavity or not be appropriately positioned in the cavity. The result is that the reliability of the RFID tags when manufactured in this and other similar processes often results in failure rates of 5 to 10% that are wholly unacceptable.

In order to eliminate those RFID tags that are inoperative, one must test the tag before applying it to a package, which is another time-consuming and costly procedure that may not be totally successful when microscopic integrated circuit-type tags are involved.

Multiple Integrated Circuit Microradio Chips at an Antenna Feed Point

What is therefore needed is first a manufacturing technique for manufacturing RFID tags that reduces the cost of the individual integrated circuit by reducing the size of the integrated circuits; and secondly a technique for coupling multiple integrated circuits to the feed point of the antenna in a way that virtually guarantees a 100% yield while at the same time eliminating the use of pick-and-place machines.

Figure 1:
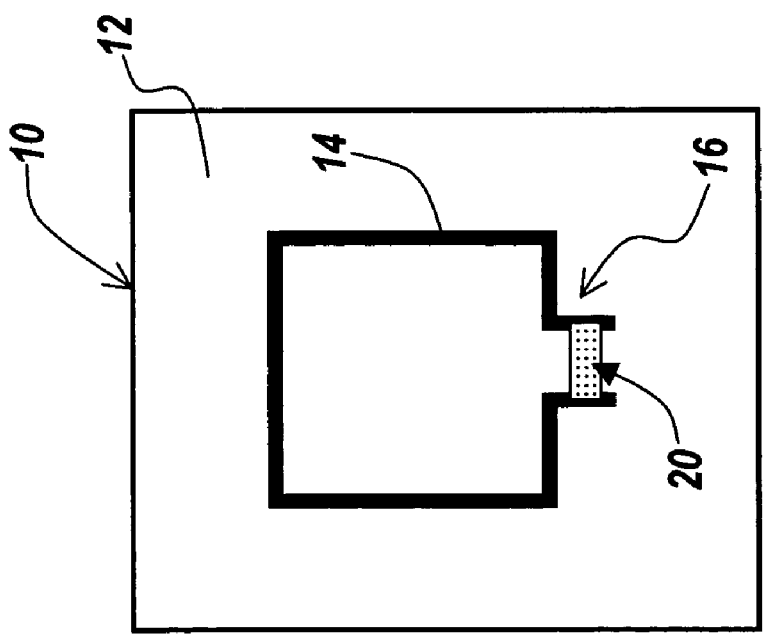
FIG. 1 is a diagrammatic illustration of the connection of a single integrated circuit microradio chip across the feed point of a loop antenna.

Referring now to FIG. 1, for an RFID tag 10 a substrate 12 is provided, in one embodiment with a printed circuit antenna 14 in the form of a loop that has a feed point 16 at which is coupled an integrated circuit microradio 20. It is the purpose of the microradio to parasitically obtain power from a reader whose energy is collected by antenna 14 and is utilized to power the circuits of the microradio prior to interrogating the integrated circuit for whatever information is carried therein. The information can be simple bar-coding information or rather sophisticated information which, upon probing by a reader, is transmitted out through antenna 14 to the reader.

Such integrated circuit microradios are described in the aforementioned PCT Patent Application US2006/033,111 assigned to the assignee hereof and incorporated herein by reference.

As explained above, it is only with difficulty that one can properly orient and couple an integrated circuit microradio 20 to the feed point 16 of antenna 14.

There are two issues with the proper operation of such a single microradio embodiment. First is the question of whether the integrated circuit is functional at all and secondly, whether or not there is proper coupling between the integrated circuit microradio and the feed point of the antenna.

In the past, manufacturers of RFID tags have had to test a completed tag for operability. However, as illustrated in FIG. 2, if one were to be able to locate multiple integrated circuit microradio chips 20 at feed point 16 of antenna 14, then a number of advantageous results occur.

First, if one could locate numbers of microradios at the feed point, at least some of them will be operative and at least some of them will be properly coupled to the antenna feed point. As the number of microradios deposited at the antenna feed point increases, then the likelihood of there being a malfunctioning tag goes to zero depending on the number of microradios involved at the feed point.

If one can deposit a number of randomly oriented microradios at the feed point, then depending on the number of microradios the probability of failure for a given RFID tag falls dramatically, thus obviating the need for testing.

Also discussed in US2006/033,111 is a system for being able to deposit a large number of integrated circuit microradios at the feed point of an antenna.

Referring now to FIG. 3, what is described is a number of randomly oriented microradio chips 20 located in a nonconductive fluid such as a non-conductive ink 21, which is printed or deposited over the gap 22 of a feed point to antenna 14 which includes spaced-apart conductive portions 24 and 26.

With the integrated circuit microradio chips 20 mixed in with the non-conductive ink 21 and deposited at feed point 16, then by overprinting the non-conductive ink with a patterned conductive fluid 28, one can couple the microradios to the antenna at the antenna feed point.

As will be discussed, when the microradios are programmed from a reader 30 which emits an interrogation signal 32 from an antenna 34, the programming of the microradios can establish the tag identity, and various other factors that result in coherent operation of the microradios at the feed point as well as polarity selection and orientation selection so that when the microradios work in concert, not only is a robust signal achievable from antenna 14, the cost of the tag is dramatically reduced and tag failure rates plummet to close to zero.

As described in the above-mentioned patent application, in one embodiment an integrated circuit layer is provided with a plethora of individual microradio chips designed and fabricated according to techniques well known in the industry. In one embodiment a microradio chip, when diced from a wafer, includes a base semiconductor material containing the circuitry in a layer above the base material. This layer is actually composed of several sub-layers of integrated circuit materials and conductive materials, with a top sub-layer being of an electrical shield as is common in integrated circuits.

An electrically insulating layer is applied over the electrical shield, whereas on top of this layer is formed an electrically conductive layer that is connected electrically to the appropriate part of the IC layer, with this layer serving as one connection to an antenna. The integrated circuit microlayer also is provided with a further conducting layer applied to the bottom side of the substrate, with this layer being connected to the appropriate part of the IC layer and serves as the other connection to the antenna.

What is accomplished by this fabrication technique is a microradio having two contacts with two opposed conducting layers, with the microradio having an inherent polarization due to the dipole structure thus provided.

Figure 4:
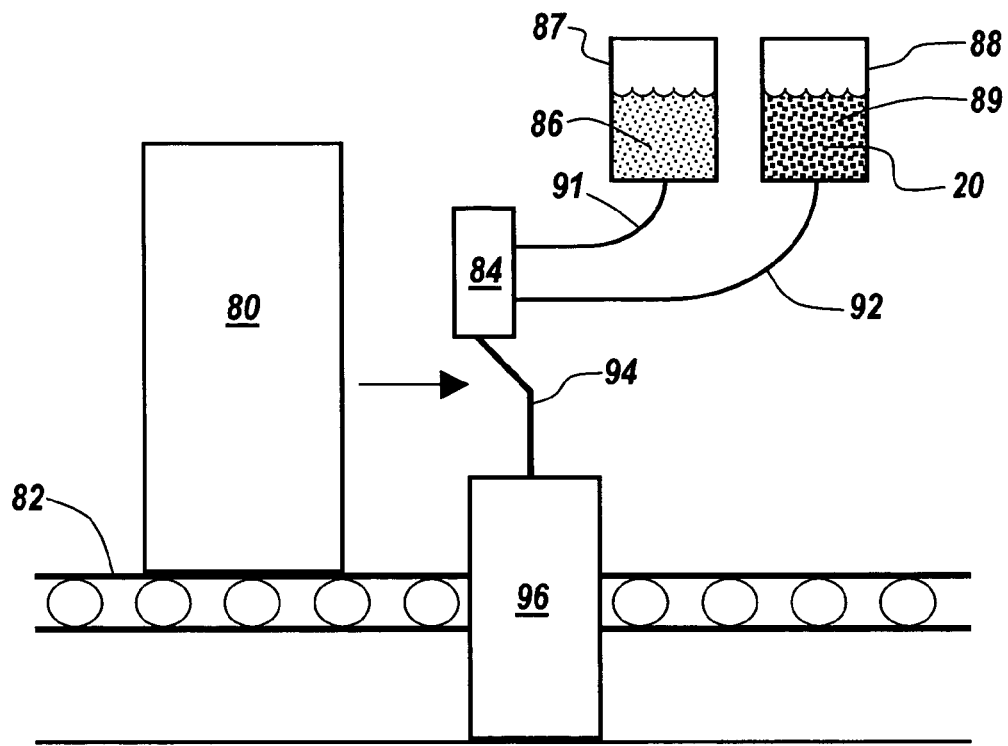
FIG. 4 is a diagrammatic illustration of the use of two fluids and a printing process for depositing a number of integrated circuit microradios at the feed point of an antenna as well as the patterning of conductive material so as to be able to couple the deposited microradios to the antenna feed point.

Referring to FIG. 4, what is illustrated is a method of manufacture of the subject tag. In this example, the tag is printed directly onto the end item. End item 80 is shown on a conveyor 82, moving past printer head 84. Printer head 84 is mounted on adjustable arm 94 and base 96, which may contain control electronics. Conductive ink 86 is held in reservoir 87, which is connected to print head 84 by conduit 91. Reservoir 88 contains a mixture of microradio chips 20 suspended in nonconductive fluid 89. Reservoir 88 is connected to print head 84 by conduit 92.

As item 80 moves past print head 84, antenna 14 is first printed onto end item 80 using conductive ink 86. More than one microradio chip is then dispensed from print head 84 into the drying ink and in the correct location with respect to antenna 14's feed point, where one or more of the contacts will be embedded in the drying ink and thus be connected to the antenna. A second portion of patterned conductive ink 86 is then applied over microradios 20 to complete the electrical connection to antenna 14 by connecting another contact to another portion of the antenna. Note that layer 100 floats on top of liquid 89 and is not miscible with the non-conducting fluid. It will be appreciated that the same result could be achieved by moving arm 94 over a stationary end item 80.

Figure 5:
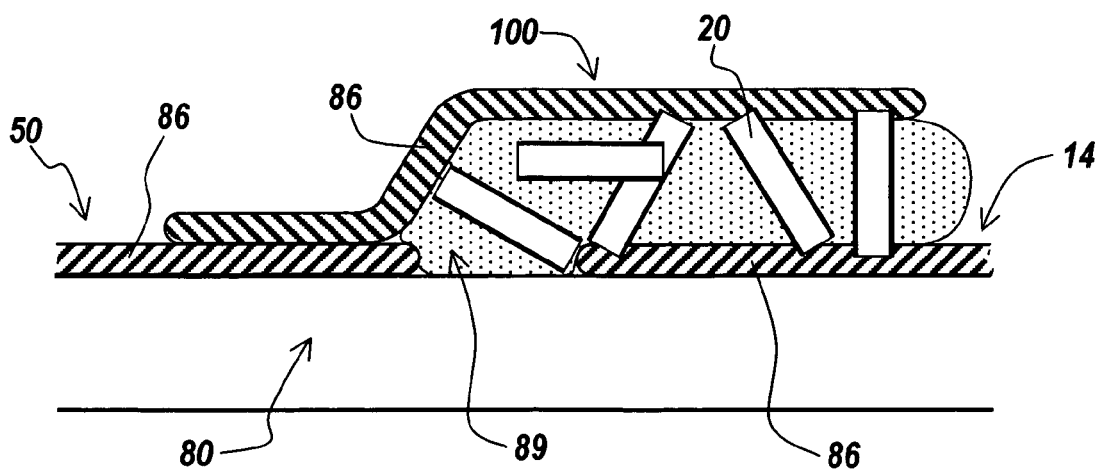
FIG. 5 is a diagrammatic illustration of a number of integrated circuit microradio chips having a three-dimensional contact structure in which the indicated microradio chips have their electrodes coupled between one side of the feed point of the antenna and the overlying conductive element to the other side of the feed point of the tag antenna.

FIG. 5 illustrates a cross-section of the tags in the region of antenna 14 where several microradio chips 20 are located, which will serve to clarify the manufacturing process described in FIG. 4. Antenna 14 is applied to end item 80. Microradio chips 20 are dispersed in nonconductive fluid 89. Electrical connection between the microradios and antenna 14 is then established by conductive ink layer 100.

Furthermore, it will be appreciated that some of the microradio chips 20 may be correctly connected between an antenna, here shown at 50, and layer 100. However, many will be either shorted out by conductive fluid or not connected at all. More importantly, some of the microradios that are connected may have electrode 36 connected to layer 100 and some may have electrode 38 connected to this layer. This creates a situation wherein these two forms of connect compete with each other or in some cases cancel each other out completely.

Now referring back to FIG. 3, a programming device is used to select one connection and disconnect the other, thus providing a workable tag. This programming device may be a simple fuse and diode in one preferred embodiment. For integrated circuit design considerations, it may be preferable to use an anti-fuse approach instead. Other programmable elements, for example, one that automatically recognizes the correct connection may be used.

It will be appreciated that only those integrated circuit microradios that are properly connected from layer 86 to layer 100 will be activated during the programming process due to their appropriate connection across the feed point of the antenna.

Figure 6:
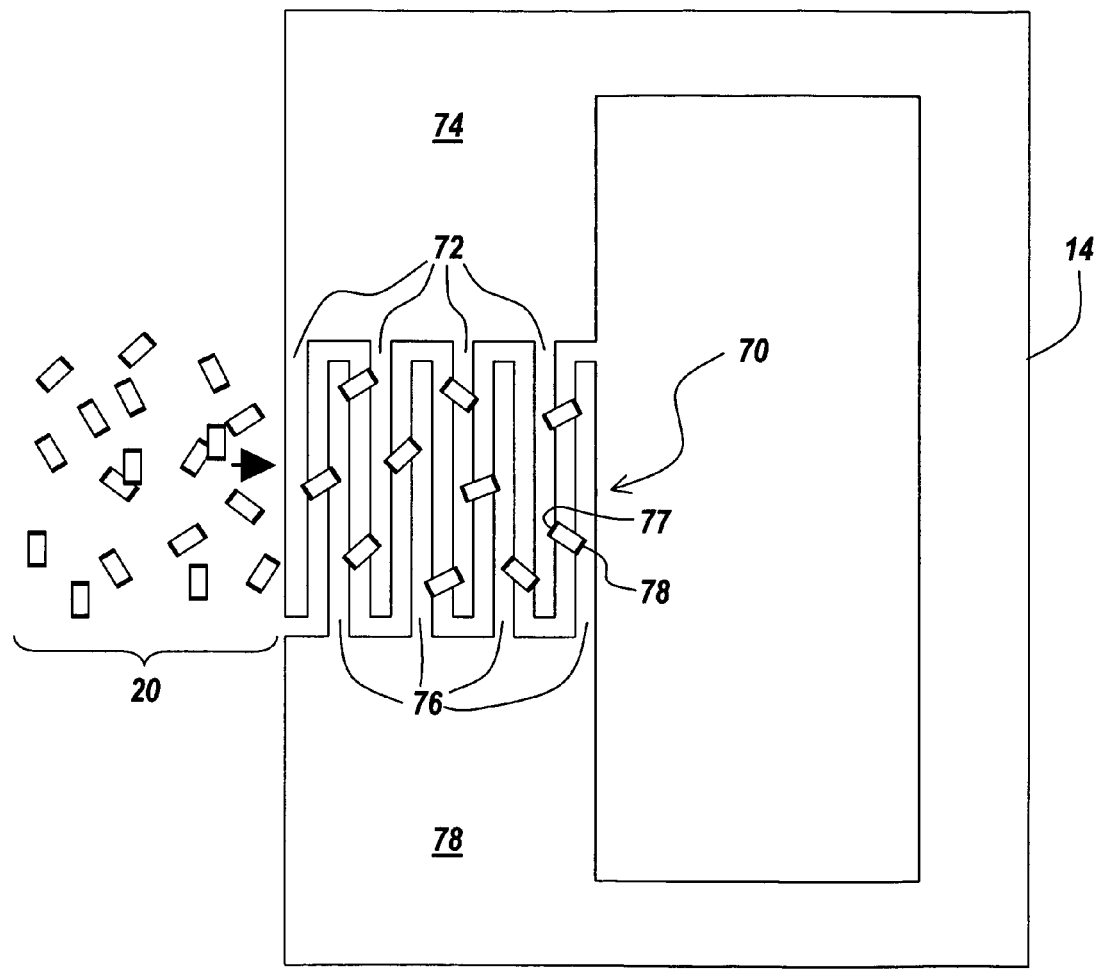
FIG. 6 is a diagrammatic illustration of the depositing of a number of integrated circuit microradio chips on an interdigitated finger structure provided at the feed point of a loop antenna, so that numbers of integrated circuit microradio chips may be coupled to the feed point of the tag antenna.

One method of assuring that multiple integrated circuit microradios are connected to the feed point of an antenna is shown in FIG. 6, in which antenna 14 has an interdigitated feed.

Referring to FIG. 6, antenna 14, which is in this case a loop antenna, is provided with an interdigitated feed 70 that contains a series of tines 72 connected at feed point 70 to a portion 74 of antenna 14.

Likewise, interdigitated tines 76 are interdigitated between tines 72 and are electrically connected to a portion 78 of antenna 14.

Thus the feed region 70 of the antenna has a large interdigitated gap. For quick and inexpensive placement of a chip, the chip can be randomly placed on the interdigitated gap at the antenna feed, where the gap is made the same size as the separation between the two pads on the chip. Chip dimensions should be minimized for economy of manufacture, with the chip dimensions also being determined by RF components and pad dimensions. The 2:1 aspect ratio of the chip allows only those chips that are correctly placed to make contact with the antenna by bridging the gap between the interdigitated tines or fingers.

In general, the chip should be long enough to cross the two disconnected adjacent tines. However, they should not be so long as to cross three tines because the chip could potentially make contact with two tines on the same side of the antenna feed, and the chip will be ineffective. The dimensions of the interdigitated tines can be optimized for the dimensions of the chip, or the chip can be optimized for the dimensions of the tines. In either case, there should be approximately equal spacing for the tines and for the pads on the chip. The pad structure on the chip can be narrower with a high aspect ratio, or triangular, to maximize probability of contact. Each individual pad should not be large enough to cause shorting across the gap.

Here microradio chips 20 are randomly deposited over the tines of the interdigitated feed so that at least one chip will be properly aligned across the gap between the tines, thereby establishing a direct DC connection of the microradio across the tines of the feed point of the antenna.

The chips can be painted on, blown on or dispensed similar to inkjet printing. The last method is disclosed in the aforementioned PCT Application US2006/033,111. As will be seen, this method is probabilistic. This means that it is highly probable given a large number of microradios dispensed on the interdigitated structure that at least some microradio chips will be properly positioned across adjacent tines of the interdigitated feed structure.

This method does not require precise orientation and positioning of the chip on the feed region if one or more chips are used. It is noted that magnetostatic, electrostatic or photoconductive orientation methods may be used to ensure orientation and positioning of the chips.

As will be appreciated, the proper orientation of chips 20 across adjacent tines 72 and 76 is such that conductive ends 77 and 78 directly attach to the opposed tines.

Polarization Control

Figure 7:
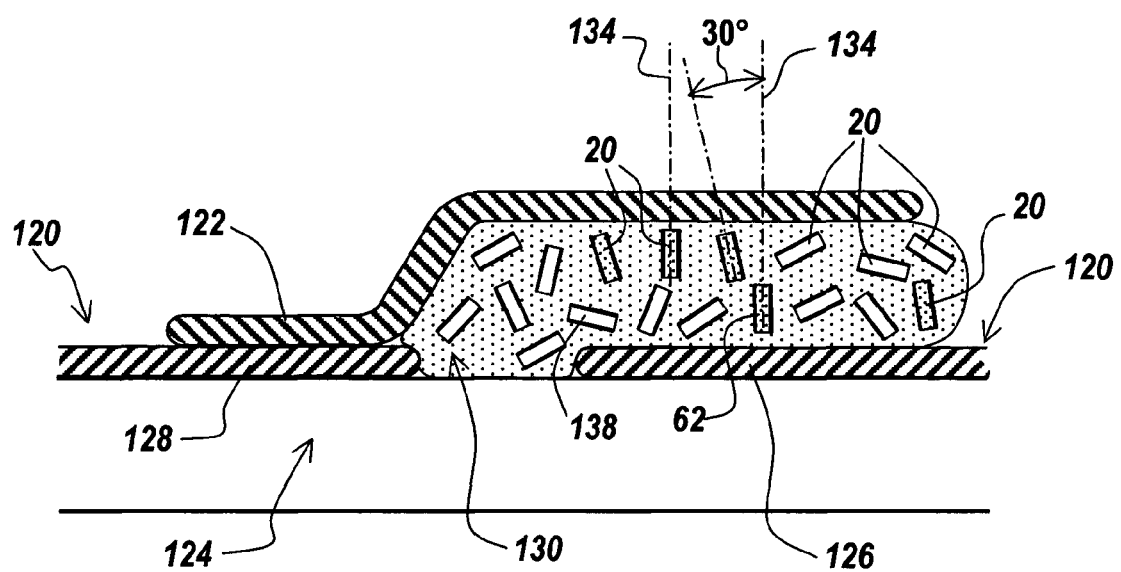
FIG. 7 is a diagrammatic illustration of integrated circuit microradios carried in a non-conductive fluid, some of which are selected for operation due to the orientation of the microradio chip with respect to the feed point of the antenna; and, FIG. 8 is a diagrammatic illustration of the selection of the coheretization of microradio chips during a programming process through the use of a pseudo-random number generator and a seed to determine transmission time slot for providing coherent operation of all of the microradio chips at the feed point of a tag antenna.

Referring now to FIG. 7, whether or not that one has direct DC coupling between the end pieces of an integrated circuit microradio, it is possible to obtain electromagnetic coupling between conductive portions 52 and 54 of antenna 14.

With a rectilinear structure for the RFID chip, this type of structure having opposed contact pads or tabs results in a preferential polarization direction for the RFID chip.

In essence, opposed metallic end caps provide a dipole structure for the transmission of information to and from the RFID chip.

Assuming that one has two chips, located at the feed point of a tag antenna, then it is important that the polarization direction of these chips be aligned one with the other. To this end, a chip may have an E-field vector at time $T_0$ parallel to the E-field vector of another RFID chip.

Thus at time $T_0$ the E-field vectors are parallel to each other and in the same direction.

As will be appreciated, these E-fields will exist at $T_0+\pi$ radians, with a change in the direction of the RF signal applied to the end tabs or conductors of the chip.

Due to the instantaneous E-field direction at time $T_0$ and the opposed field direction at time $T_0+\pi$ radians, the outputs of these two identically constructed microradios or RFID chips will add coherently.

Should, however, the chips be oriented such that one has a north orientation for its E-field vector and the other a south orientation, then it is quite clear that the energy from these chips will cancel each other.

As seen in FIG. 7, microradio chips 20 can be electromagnetically coupled to the feed point of an antenna described by conductive traces 120 and 122 by providing a substrate 124 with a conductive trace 126 that connects to one side of the antenna and forms a feed point to the antenna, whereas a conductive trace 128 connects to the other side of the antenna at its feed point.

As illustrated, a non-conductive slurry 130 contains randomly oriented microradio chips 20 that are disposed in the slurry or fluid.

The conductive trace 128 is coupled to the microradios through an overlying conductive ink trace 122, which overlies the slurry containing the microradios such that RF energy from the microradios will be coupled to the feed point of the antenna due to RF coupling techniques.

The gain of the individual microradios may not be sufficient to enable coupling energy to and from the microradios to the antenna and vice versa. However, by providing a large number of microradios in the gap between traces 122 and 126, if coherent operation is achieved, one can increase overall output so that when added together there is sufficient signal strength.

There are two issues that must be addressed in order to obtain sufficient gain for this non-direct DC coupled embodiment and that is that one needs to be able to select microradio chips that have a predetermined orientation, in this case a vertical orientation as indicated by vertical dotted lines 134. It will be noted that the shaded microradio chips 20 are oriented such that they are, for instance, within 30 degrees of a vertical established as being perpendicular to the top surface of substrate 124 and the plane of the antenna feed traces.

The ability to select for activation only microradios having this vertical orientation or indeed any predetermined orientation is important to the obtaining of the maximum amount of gain from the ensemble of microradios in the slurry.

In one embodiment this is simply accomplished by activating only those microradios having a vertical orientation, meaning that the programming power picked up by the antenna will only be of sufficient level to activate microradios in a predetermined orientation. Other radios that are located at orientations that are non-optimal will not receive enough of a signal from the programming step to cause the programming code to be received by the microradios. Assuming improper physical orientation, the microradios may not be able to be parasitically powered. Thus if the orientation direction of the microradios is suboptimal such as, for instance, as illustrated by the orientation of microradio 138, it may not be able to be parasitically powered.

Moreover, for instance, if a microradio is vertically oriented with respect to traces 122 and 126, this microradio can have a polarization direction such that north points up and south points down, with the E-field associated therewith oriented south pointing down and the E-field vector pointing up. Alternatively, the orientation can be reversed.

As mentioned hereinbefore, if vertically oriented microradios in one embodiment have opposite polarization directions, then there will be phase cancellation of the outputs of these radios, which deleteriously affects the operation.

In short, if the microradios are envisaged as having a cubic structure, with opposed conductive tabs, then for a north-facing polarization orientation, a signal source can be appropriately connected.

If the connection from the signal source is reversed, then the polarization of the microradio will be in a southerly or down position. This polarization can be switched during programming by sensing inversion of a digital code.

Coherent Microradio Operation

Figure 8:
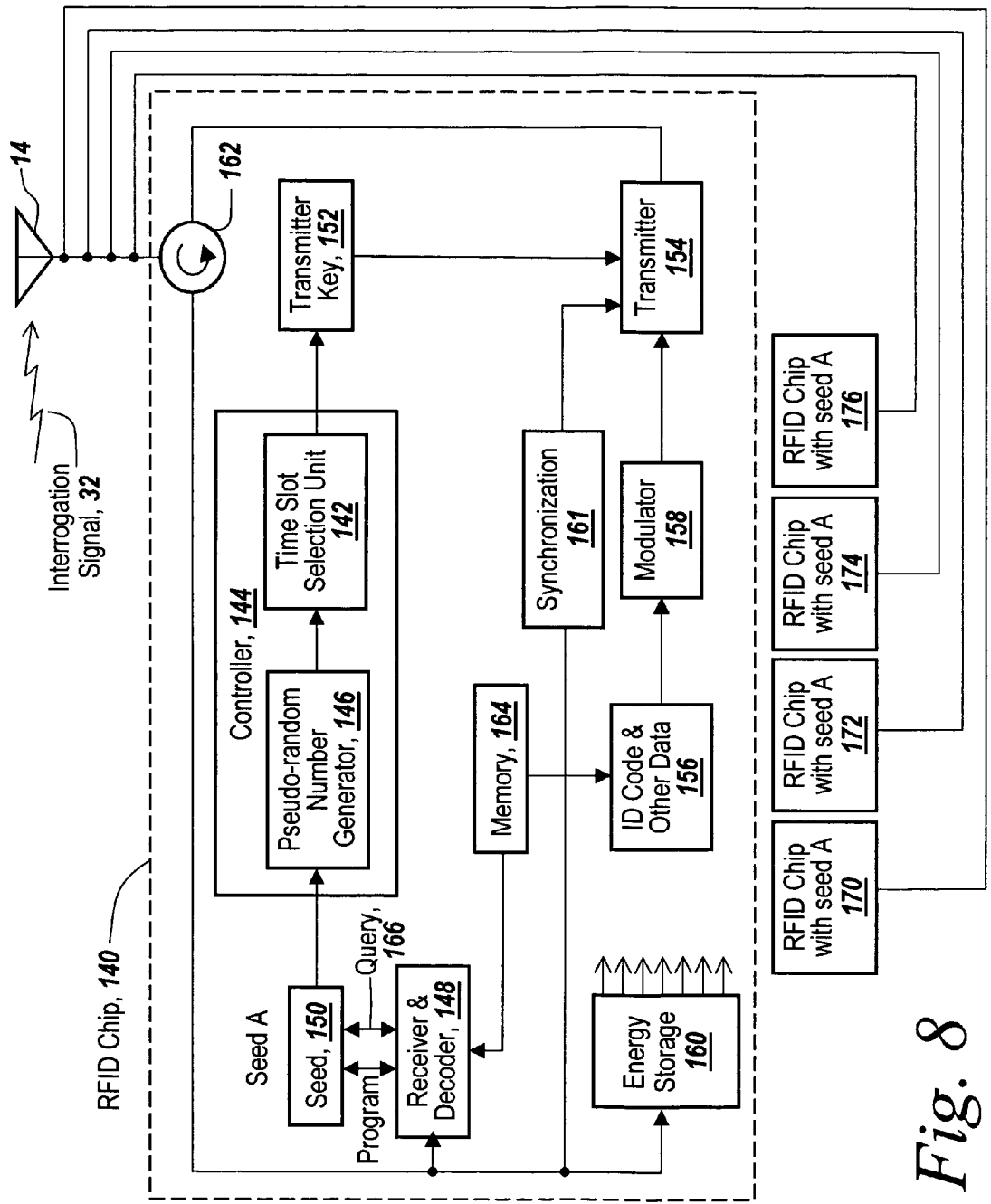

With respect to the ability to have the integrated circuit microradios operate in a coherent fashion and referring now to FIG. 8, one method of providing the coherence is to provide each and every one of the integrated circuit microradio chips with an identical feed for their pseudo-random number generator. When this is done, each of the microradios will produce the exact same signal at the exact same time when probed by an interrogating signal from a reader.

Assuming that all integrated circuit microradio chips are appropriately activated, programmed, and coupled to the antenna feed, there is a requirement that when interrogated, all of these microradios transmit at the same time and with the same data so that they work together cooperatively or coherently. It is desired that these microradios when properly coupled and activated will act in unison so that the signals from the tags will add cooperatively and not destructively. If they add destructively the information transmitted will be garbled. If they add cooperatively, the transmission will not be garbled. Also, with cooperative adding there is a quadratic power level enhancement such that the minuscule outputs of the microradios add to provide a more robust tag output signal. Note that a tag made in this fashion will be indistinguishable from a convention single chip tag.

If these RFID chips implement the so-called slotted ALOHA protocol or other similar communications protocols, then these chips would by design transmit at different times and be in different time slots.

The purpose of these protocols is to address the problem of so-called "collisions" between RFID tags that transmit at the same time. This was accomplished by utilizing a pseudo-random number generator to control the time at which a tag would transmit. Upon an interrogation signal, the pseudo-random number generators generate different numbers to set different time slots for transmission so that the tags would have a staggered output that would be readable by the reader.

In normal operation, the reader sends out a burst of RF energy and any tag that can receive this energy uses this RF energy to charge up some kind of energy storage like a capacitor that is inside the tag. The electronics in the tags then begin to work and the reader then sends out a query command that says, "OK, is there anybody out there and if you're out there, please respond to me."

In the simplest case, only one tag is queried and responds to indicate its presence. The reader then acknowledges the existence of the tag and requests the tag information. In one embodiment, the tag then sends back the information, in a simple 96-bit code that would be a unique identifier for the item or product that it is on. The reader then acknowledges receipt of the information and causes the tag to turn off.

As will be appreciated, this standard protocol was devised for the case where one has tags having outputs that collide with each other. In one scenario there might be 50 tags or 100 tags all charged up and ready to go. The reader sends out a query command and, for instance, two of those tags respond in the same time slot. The reader recognizes the collision and asks the tags to try again. Those tags that collided go through a process to pick out a different time slot to respond in and afterwards do not collide with each other.

This change of time slot is done by a pseudo-random number generator. The pseudo-random number generator takes a stored seed number and uses a software program or firmware to generate another number. Each of the tags that have collided has a different seed in them to cause the pseudo-random number generator to output a different time slot number.

After the two colliding tags have picked out new time slots to respond in, the reader comes back and queries the tags again. Then the tag responds at its designated time slot in a normal way, with the other tag then responding in a different time slot. Thus the signals from the two tags are disambiguated.

If one has 50 tags or 100 tags, there is a higher probability of collision and maybe even some probability of multiple collisions. To solve the multiple collisions problem, the above process is invoked sequentially until all 50 or 100 tags are read out.

While the slotted ALOHA protocol is useful in reading out different tags on different items, in item level tagging addressed by the micro miniature radios described herein, if these microradios or RFID chips use the slotted ALOHA protocol and transmit at different times, not only could there be destructive interference, there could be no cumulative signal strength increase due to coherent transmission.

With multiple microradio chips in a single tag, the tag must respond just like any other single chip tag. All of the chips within the tag must therefore respond in an identical manner to the reader and cooperate with each other. The word, "cooperate" is another word for the fact that the microradio chip outputs have to be coherent with each other. They have to send out the same kind of data, and they have to pick the same time slot using the pseudo-random number generator. To the outside world, the outside world cannot and should not ever know that there are multiple chips on this single tag. Since these chips are designated to meet standard protocols, coherence is achieved as follows:

First, the tags are programmed at the time they are placed on an item. During that programming phase, all of the microradio RFID chips on an individual tag are programmed with the same seed for their pseudo-random number generators. Because the pseudo-random number generator always gives the same time delays, all chips will transmit their information to the tag antenna in the same time slot.

When the tag is charged up by the reader, the tag electronics turn on. As a result, each chip in the tag is active. The reader then sends out a query and each chip then individually responds and sends a signal out through the common antenna, with all chips sending out the same kind of signal. These are on/off digital signals in which the ones and zeroes come out at the same time from each of these chips.

The way to ensure that all chips send out signals in the same time slot is that each of the chips is provided with the same seed for the pseudo-random number generator during programming. Because of the use of the identical pseudo-random number generators in the chips, when provided an identical seed, each of the transmitters in the chips will transmit in the same time slot.

What happens in the case where one has numbers of these tags is that each of the tags is programmed with a different seed for its chips, so that collisions will not occur. If they do occur, the signals from the reader instruct different tags to install different seeds in different tags. This means that the original seed used to create coherence is changed for each of the microradios in its tag. The subject system works just like the standard case, with the result being that each tag is programmed to transmit in a different time slot.

Thus initially, in the subject invention each tag is programmed with a different seed during attachment to an item. This seed is changed if later on there are collisions. Note that the seeds for a tag can be programmed at the time of applying the RFID label to a package. Thus before the product ever leaves the manufacturer to move to the merchandiser, it is programmed both with an ID and a seed.

Since all of the above microradios have non-volatile memory, during programming one can write in the 96-bit product code and the seed. As a result, it is in the programming phase where the differences among the tags are generated.

In short, within a tag having multiple microradios, all have the same seed and work coherently. For different tags, however, they are initially programmed with different seeds so that they will transmit in different time slots.

More specifically, if each of the microradios at the feed point of an antenna is programmed to transmit simultaneously by using the same pseudo-random number generator with the same seed, then the microradios will act in unison or coherently. This will also have the beneficial effect of increasing the signal strength of the signal applied to the antenna.

As described in the aforementioned patent applications, each of the individual microradios or RFID chips is selectively activated and is also provided with a non-volatile memory into which an ID code is programmed from a programming station.

Thus, utilizing the standard slotted ALOHA protocol described in detail in the ISO/IEC 18000 or epcGlobal™ standards as well as in the RFID handbook, one can construct microradios or RFID chips that can be made to operate in a coherent fashion in response to an interrogating signal.

In summary, for coherency one must make all of the microradios at the feed point of an RFID tag antenna transmit at the same time with precisely the same information so as to avoid destructive interference and achieve the signal level increase associated with multiple microradios transmitting at the same time through the same antenna.

Referring to FIG. 8, one way of providing coherence for each of the microradios is to assure that they transmit in the same time slot.

In one embodiment an RFID chip 140 includes a time slot selector 142 which is inside controller 144 that includes a pseudo-random number generator 146. This type of controller, be it a software or a firmware controller, is structured in accordance with the standardized anti-collision time slot protocols, with the pseudo-random number generator originally designed to output different numbers to establish random time slots.

However, in the subject invention this same architecture is utilized to ensure that each of the RFID microradios all transmit identical information in the same time slot.

It will be appreciated that an RFID microradio chip includes a receiver and decoder 148 which receives signals from a programming device and installs seed 150 into a non-volatile memory on the chip, in this case SEED A.

The time slot selection unit 142 activates transmitter key 152, which in turn keys transmitter 154 on to output the programmed ID code and other data stored in non-volatile storage 156, with transmitter 154 modulated by modulator 158 to transmit the digital information stored in unit 156.

In operation, the signal from the reader is first a tone burst of RF energy that is rectified and stored in energy storage 160 that powers all of the integrated circuit components needing power.

Thereafter, this probe tone from the reader continues and can be used by synchronization unit 161 to synchronize and phase lock the output of transmitter 154 to the tone. Since all other microradios are synchronized to this tone they will be synchronized to each other.

More specifically, in terms of phase coherency, it is important that not only should there be no conflict between the pulse envelopes indicative of the digital data, it is also important that the transmitters for each of the RFID chips operate coherently with respect to the other transmitters of the other chips. This permits the aforementioned power level increase as well as maintaining better control over the generation of the pulse envelopes corresponding to the ones in zeroes of the data to be transmitted from the microradio through the antenna to the reader.

The synchronization occurs by tapping off the normal 900 megahertz signal from the reader after energy storage 160 has produced enough energy to power the transmitter. Transmitter 154 is locked into synchronism with the waveform from the reader that arrives at antenna 14 and is supplied to synchronization unit 161 to control transmitter 154 utilizing phase lock loop technology.

Optionally, each microradio may adaptively tune itself to generate maximum output by for instance sensing the VSWR on the transmitter path.

Thereafter, upon transmission of an additional query signal decoded by receiver 148, seed 150 is installed in pseudo-random number generator 146, with this seed setting the time slot for the transmission of the indicated information from transmitter 154 out through antenna 14.

In one embodiment a unit such as a circulator 162 isolates the receiver section of the RFID chip from its transmitter section.

As discussed in the aforementioned patent applications, the RFID microradio is first programmed with the particular identification number of the item to which it is to be attached, plus a unique seed number. This programming is established by receipt of programming signals by antenna 14, which are received by receiver 148 and decoded so as to set seed 150, in this case to a value SEED A.

After the programming step, a query from the reader is detected by receiver and decoder 148 in accordance with information stored in memory 164. This in turn produces a signal on line 166 to install seed 150 in the pseudo-random number generator to ensure the keying of transmitter 154 in the same time slot.

As can be seen in this illustration, identical RFID chips 170, 172, 174 and 176 are each provided with identical seeds, namely SEED A, so that upon receipt of an interrogation signal at antenna 14, each of the RFID chips acts in exactly the same manner to transmit exactly the same information at the same time in the same time slot. In this manner, the microscopic microradios or RFID chips have their outputs added coherently so that what is transmitted from antenna 14 is the same signal and the various chips cooperate rather than competing with one another. Without this coherence, scrambled signals that could not be understood by the reader could result.

What has thus been described is the operation of a single tag having multiple microradios, which in the aggregate provide a robust tag output signal for item-level tagging at an extremely low cost per tag.

While the above description has involved the use of microradios tuned to the same frequency, it is within the scope of the present invention that the microradios can be tuned to different frequencies. One application of having microradios at a single feed point tuned to different frequencies is that if there is a failure of one of the microradios at one frequency, probing at a different frequency will result in an operational tag. Also, for dual frequency tagging systems it would be important to have microradios tuned to those different frequencies.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In an RFID tag system, a tag having an antenna and a feed point and more than two randomly oriented integrated circuits that transmit phase coherent signals in which there is zero phase difference between the signals from said integrated circuits such that said signals constructively add to provide either increased range or a better signal to noise ratio at a given range, at least two of said randomly oriented integrated circuits being coupled to the feed point of said antenna, said more than two integrated circuits being deposited in a random manner with random orientations over the feed point of said antenna through a printing process in which said integrated circuits are immersed in a non-conductive fluid constituting an ink deposited by printing over the feed point of said antenna, at least two of said integrated circuits with phase coherent signals being coupled to the feed point of said antenna, whereby the random orientations do not prevent robust RFID operation.

2. The RFID tag system of claim 1, wherein each of said integrated circuits includes a microradio.

3. The RFID tag system of claim 1, wherein each of said integrated circuits includes an RFID microradio chip.

4. The RFID tag system of claim 3, wherein said microradio chips, when transmitting, transmit coherently.

5. The RFID tag system of claim 4, wherein said integrated circuits each include a microradio chip including a transmitter and wherein coherent operation includes multiple microradio chips coherently outputting the same signal at the same amplitude in the same time slot and in which the signals exhibit phase coherency one to the other.

6. The method of claim 1, wherein the range of the tag is increased due to the coherent operation of the RFID integrated circuit microradio chips.

7. A method for providing an RFID tag in an RFID system, including an RFID reader and a tag, comprising the steps of:
providing the RFID tag with an antenna having a feed point; and,
randomly depositing more than two RFID integrated circuit microradio chips having phase coherent outputs at the feed point of said antenna in a non-conductive fluid, such that there are operational RFID integrated circuit microradio chips properly coupled to the feed point of the antenna and operating phase coherently.

8. In an RFID tag system in which a tag has an antenna with a feed point, a method for improving the performance of the system comprising the step of providing more than two randomly oriented RFID integrated circuit microradio chips operating phase coherently at the feed point of the antenna further including:
providing a non-conductive fluid with more than two RFID integrated circuit microradio chips entrained therein;
patterning the fluid over the feed point of the antenna; and,
patterning at least one conductive trace on top of the non-conductive fluid.

9. The method of claim 8, and further including the step of controlling the polarization of the RFID integrated circuit microradio chips such that all of the RFID integrated circuit microradio chips that are coupled to the antenna feed point are provided with the same polarization to provide phase coherent action.

10. The method of claim 8, and further including the step of providing each of the RFID integrated circuit microradio chips with a pseudo-random number generator for the control of the timing slot at which the RFID integrated circuit microradio chip transmits and providing identical seeds to all of the RFID integrated circuit microradio chips such that all of the RFID integrated circuit microradio chips transmit in the same time slot, thus to assist in providing coherent microradio chip operation.

* * * * *